United States Patent [19]

Oliveira da Cunha Lima

[11] Patent Number: 5,607,981
[45] Date of Patent: Mar. 4, 1997

[54] METHOD OF MANUFACTURE OF PAINT AND ADHESIVE RUBBER FROM VULCANIZED RUBBER

[75] Inventor: Luiz C. Oliveira da Cunha Lima, Rio de Janeiro, Brazil

[73] Assignee: Relastomer S/A, Rio de Janeiro, Brazil

[21] Appl. No.: 193,648

[22] Filed: Feb. 7, 1994

Related U.S. Application Data

[63] Continuation of Ser. No. 842,386, filed as PCT/BR91/00014, Jul. 24, 1991, published as WO92/01760, Feb. 6, 1992, abandoned.

[30] Foreign Application Priority Data

Jul. 26, 1990 [BR] Brazil ..................... 9003626

[51] Int. Cl.$^6$ ............... C08J 11/04; C08K 3/08
[52] U.S. Cl. .............. 521/41; 521/41.5; 521/42; 521/44; 521/44.5; 521/45; 521/45.5; 241/46.15; 241/170; 422/286; 422/292
[58] Field of Search ............... 521/41, 41.5, 42, 521/44, 44.5, 45, 45.5; 241/46.15, 170; 422/286, 292

[56] References Cited

U.S. PATENT DOCUMENTS

| | | | |
|---|---|---|---|
| 3,523,493 | 8/1970 | Berry et al. | 521/41 |
| 3,890,141 | 6/1975 | Crane et al. | 521/44.5 |
| 4,052,344 | 10/1977 | Crane et al. | 521/44.5 |
| 4,098,737 | 7/1978 | Lee et al. | 521/44 |
| 4,161,464 | 7/1979 | Nicholas | 521/42 |
| 4,992,492 | 2/1991 | Sainton | 524/71 |
| 5,359,007 | 10/1994 | Oliveira Da Cunha Lima | 524/413 |

FOREIGN PATENT DOCUMENTS

| | | |
|---|---|---|
| 8605192 | 9/1986 | Brazil . |
| 26-11629 | 6/1941 | Japan . |
| 41-011629 | 6/1966 | Japan . |
| 50-98987 | 8/1975 | Japan . |
| 9201745 | 2/1992 | WIPO ............... 521/41 |

OTHER PUBLICATIONS

Derwent Acession No. 68–639 51P (WPI) & JP,B, 66/11 629 (Hayakawa Gomu K.K.) 1966 (66).
Derwent Acession No. 77–315 13Y (WPI) & JP,A, 50/98 987 (Tokyo Rubber Ind. K.K.) 06 Aug. 1975.
WO, aL, 86/05 192 (oliveira da cunha lima) 12 Sep. 1986, see claims.

*Primary Examiner*—Paul R. Michl
*Assistant Examiner*—Olga Asinovsky
*Attorney, Agent, or Firm*—Cushman Darby & Cushman IP Group of Pillsbury Madison & Sutro LLP

[57] ABSTRACT

Method of manufacture of paint and adhesive of rubber from vulcanized rubber that is reclaimed, becoming a product that provides impermeability, flexibility and resistance to the pellicle by process of reduction to small particles through cracking beater mills, immersed in adequate solvents and recovered in ball mills to which is added products such as dyeing, pigments, asphalts, oils, accelerators, resins, etc., which give to the paint or adhesive its final characteristics.

14 Claims, No Drawings

METHOD OF MANUFACTURE OF PAINT AND ADHESIVE RUBBER FROM VULCANIZED RUBBER

This is a continuation of application Ser. No. 07/842,386, filed as PCT/BR91/00014 on Jul. 24, 1991 and published as WO92/01760 on Feb. 6, 1992, now abandoned.

The present invention is related to a method for obtaining industrial paint and adhesive, with proper coloration, smoothness and resilience.

The method was developed first from vulcanized rubber artefacts which have already been used such as pneumatic, scraps or others within a system that causes the formation of free radicals in very small particles of rubber in mixture or in suspension with solvents. The resultant product is posteriorly combined with filers, oils, resins, dryers, curing agents, asphalts, and the like.

Rare are the occasions where the formulation of paints or adhesives incorporate or employ reclaimed rubber. When this occurs, normally it is applied in the condition of filers, presenting only a reduction in the final product cost, in order to get better commercialization. However, this causes serious inconveniences when employed in small quantities. The reclaimed rubber renders the product rough and irregular.

The main object of the present invention is to eliminate such disadvantages and inconveniences in the traditional practice and to permit a perfect utilization of the characteristics of the reclaimed rubber with a smooth and homogenous final product.

According to the present invention, the reclaimed rubber in perfect integration with the solvent in which it is prepared, is obtained with the addition of other products such as filers, resins, corants, asphalts, anti-oxidants, oils, etc.

This method consists, in obtaining a reclaimed rubber from a vulcanized rubber reduced to small particles through industrial cracking mills of scraps of tires to be reccaped.

These small particles of vulcanized rubber are selected by passing through separator screens, leaving the refused material to be crushed again in the cracking mills.

These particles are immerged in to adequate solvents, being given preference to those which belong to the formularization of paint or the adhesive, to which other products such as oils, resins, asphalts, pigments, corants, degraders, vulcanizer agents, etc are added.

This mixture is placed in mills for homogenization and recuperation of vulcanizer rubber.

In this way, the paint or the adhesive may come out ready from the milling or in case the principal product, is prepared a composition might be done considering that the preparation of the rubber is made as previously described in document PI 8500981 which was published as WO 86/05192 on Sept. 12, 1986.

Here are some examples, which have as objective the presentation of some practical aspects of the mentioned invention and should not be considered as limitative in relation to the possibilities pertinent to the invention and understanding of inventive unity.

EXAMPLE 1

To 5 Kg of toluene, 1 Kg of scraps of tires that have passed through a screen of 5 wires/centimeter and 100 gr of oil, is added. The mixture has been previously beated in a steel ball mill composed of a league of iron and manganese, during 48 h. The final product obtained has been mixed with 500 g of asphalt and passed in a 3 cylinder mill to be uniform. The final product has been correct with solvent to be painted with pistol and applied on a iron sheet or wood properly prepared. The product presented a smooth, homogeneous and flexible surface.

To 5 kg of trichlorethylene, 1 kg of scraps of tires that have passed through a screen of 5 wires/centimeter and 100 gr of oil is added. The material has been beaten in a ball mill with steel balls, brass balls during 30 h. 10 gr of sulphur and 2 gr of diphenylguanidine, 20 gr of resine phenolic non-reactive, passed in a 3 cylinder mill was added to be uniform. A sample of square wooven and a sheet of polyethylene with low density have been prepared. A layer of the product was applied on the surface of two samples. On this painted ply another superposed one was applied forming between them a strong adherence to the cement slab also painted with the same product, a sheet of polyethylene was applied, presenting to the cement slab a total impermeability to water.

I claim:

1. A method of manufacturing a coating from scrap or waste vulcanized rubber comprising the steps of:

mixing said vulcanized rubber with an organic solvent;
   grinding said vulcanized rubber mixture in a ball mill composed of an iron and manganese composition, to produce fine particles of a reclaimed rubber from said vulcanized rubber wherein said grinding also homogenizes said mixture to produce said coating which is both smooth and homogeneous.

2. A method of manufacturing a coating according to claim 1, further comprising the step of adding at least one of dyes, pigments, asphalts, oils, accelerators, resins and filers during preparation of said coating.

3. A method of manufacturing a coating according to claim 1, further comprising the step of separating said particles of reclaimed rubber into smaller particles and larger particles after grinding said vulcanized rubber, said larger particles being reintroduced into said mill and said smaller particles being mixed with said coating product.

4. A method of manufacturing a coating according to claim 1, wherein said coating is a paint.

5. A method of manufacturing a coating according to claim 1, wherein said coating is an adhesive.

6. A method of manufacturing a coating according to claim 4, wherein at least one of manganese or sulphur is added to said mixture before said homogenization step.

7. A method of manufacturing a coating from scrap or waste vulcanized rubber comprising the steps of:

mixing said vulcanized rubber with an organic solvent;
   grinding said mixture of vulcanized rubber and solvent in a ball mill, wherein the composition of said balls is selected from the group consisting of steel and brass, to produce fine particles of a reclaimed rubber from said vulcanized rubber, wherein said grinding also homogenizes said mixture to produce said coating which is both smooth and homogeneous.

8. A method of manufacturing a coating according to claim 7, further comprising the step of adding at least one of dyes, pigments, asphalts, oils, accelerators, resins and filers during preparation of said coating.

9. A method of manufacturing a coating according to claim 7, further comprising the step of separating said particles of reclaimed rubber into smaller particles and larger particles after grinding said vulcanized rubber, said larger particles being reintroduced into said mill and said smaller particles being mixed with said coating product.

10. A method of manufacturing a coating according to claim 7, wherein said coating is a paint.

11. A method of manufacturing a coating according to claim 7, wherein said coating is an adhesive.

12. A method of manufacturing a coating according to claim 10, wherein said paint is sprayable.

13. A method of manufacturing a coating according to claim 7 wherein said organic solvent is selected from the group consisting of toluene and trichloroethylene.

14. A method of manufacturing a coating according to claim 1 wherein said organic solvent is selected from the group consisting of toluene and trichloroethylene.

* * * * *